United States Patent
Yoshinari et al.

(10) Patent No.: US 12,415,965 B2
(45) Date of Patent: *Sep. 16, 2025

(54) ADDITIVE FOR LUBRICANTS

(71) Applicant: Kanto Denka Kogyo Co., Ltd., Tokyo (JP)

(72) Inventors: Kazuto Yoshinari, Shibukawa (JP); Yuki Goto, Shibukawa (JP); Yukinari Oguma, Tokyo (JP); Hidehiko Iinuma, Tokyo (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/719,339

(22) PCT Filed: Dec. 14, 2022

(86) PCT No.: PCT/JP2022/046005
§ 371 (c)(1),
(2) Date: Jun. 13, 2024

(87) PCT Pub. No.: WO2023/112954
PCT Pub. Date: Jun. 22, 2023

(65) Prior Publication Data
US 2025/0129305 A1 Apr. 24, 2025

(30) Foreign Application Priority Data
Dec. 14, 2021 (JP) ................................ 2021-202351

(51) Int. Cl.
*C10M 125/10* (2006.01)
*C09C 3/12* (2006.01)
*C10M 169/04* (2006.01)

(52) U.S. Cl.
CPC ............. *C10M 125/10* (2013.01); *C09C 3/12* (2013.01); *C10M 169/04* (2013.01); *C10M 2201/14* (2013.01); *C10M 2203/003* (2013.01)

(58) Field of Classification Search
CPC .... C01P 2006/12; C01P 2004/64; C09C 3/12; C09C 1/00; C08K 9/06;
(Continued)

(56) References Cited

U.S. PATENT DOCUMENTS

| 2012/0214717 A1 | 8/2012 | Mclaughlin et al. |
| 2017/0073612 A1 | 3/2017 | Thiebaut et al. |

FOREIGN PATENT DOCUMENTS

| JP | 11140476 A | 5/1999 |
| JP | 2005325305 A | 11/2005 |

(Continued)

OTHER PUBLICATIONS

International Search Report, with English translation, issued in corresponding International Application No. PCT/JP2022/046005, date of mailing Feb. 14, 2023 (5 pages).

(Continued)

*Primary Examiner* — Vishal V Vasisth
(74) *Attorney, Agent, or Firm* — FLYNN THIEL, P.C.

(57) ABSTRACT

An additive for lubricants containing, a $ZrO_2$ particle coated with a silane coupling agent, and a dispersion medium for the $ZrO_2$ particle, wherein a BET specific surface area of the $ZrO_2$ particle coated with the silane coupling agent obtained by removing the dispersion medium is 40% or more of a BET specific surface area of the $ZrO_2$ particle before coating with the silane coupling agent.

9 Claims, 1 Drawing Sheet

Example 2-1

Example 2-2

Example 2-3

Comparative example 2-1

(58) Field of Classification Search
CPC ...... C08K 2003/2244; C08K 2201/011; C08K 2201/006; C09D 17/00; C09D 201/00; C09D 7/62
See application file for complete search history.

(56) References Cited

FOREIGN PATENT DOCUMENTS

| | | |
|---|---|---|
| JP | 2011202016 A | 10/2011 |
| JP | 2012172151 A | 9/2012 |
| JP | 2017506694 A | 3/2017 |

OTHER PUBLICATIONS

Written Opinion of the International Searching Authority issued in corresponding International Application No. PCT/JP2022/046005, date of mailing Feb. 14, 2023 (3 pages).
English Translation of the International Preliminary Report on Patentability, issued in corresponding International Application No. PCT/JP2022/046005, Date of Mailing Jun. 27, 2024 (5 pages).

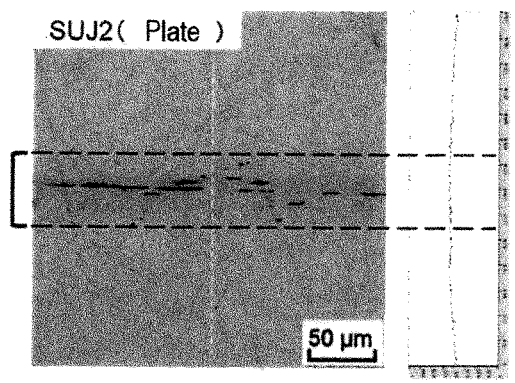
Example 2-1
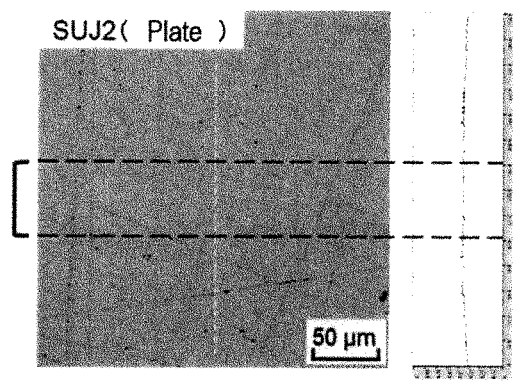
Example 2-2
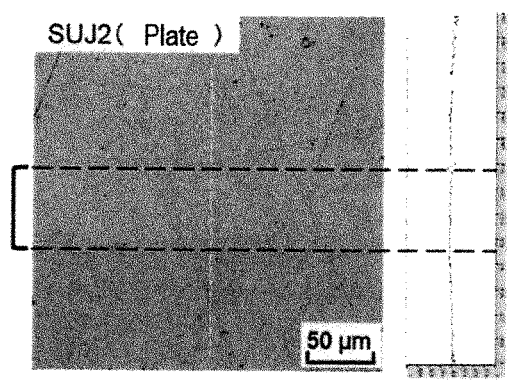
Example 2-3
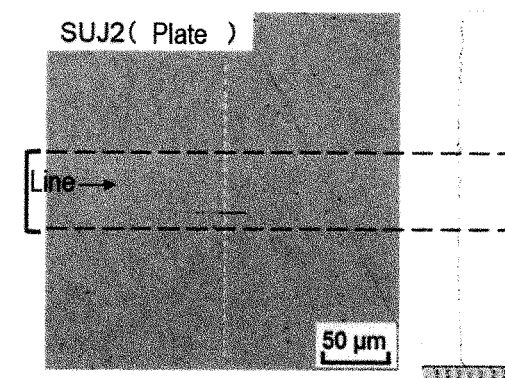
Comparative example 2-1

ADDITIVE FOR LUBRICANTS

This application is a 371 of PCT/JP2022/046005 filed Dec. 14, 2022

FIELD OF THE INVENTION

The present invention relates to an additive for lubricants, a lubricant composition, a method for producing an additive for lubricants and a method for producing a lubricant composition.

BACKGROUND OF THE INVENTION

There have been such active developments as to further enhance wear resistance or low friction of lubricants by effects of additives, and lubricant compositions containing metal oxide particles surface-treated with organic substances have been proposed.

JP-A H11-140476 discloses a lubricant composition containing a metal oxide particle composite surface-treated with an organic substance.

JP-A 2012-172151 discloses a method for making a self-dispersing cerium oxide nanoparticles additive for lubricants by an improved process of reacting a mixture of an organo-cerium salt, a fatty acid and an amine in an organic medium at a temperature ranging from about 150° C. to about 250° C. in the substantial absence of water, the improvement including, providing a reaction mixture containing the organo-cerium salt, the fatty acid and the amine at a predetermined molar ratio to provide a reaction product containing from about 20 to about 40% by weight of the nanoparticles in the organic medium.

JP-A 2017-506694 discloses a lubricant composition having a predetermined kinematic viscosity ranging from 4 to 50 cSt, and containing a base oil, a compound containing a dithiophosphate group, and metal nanoparticles at a content by weight ranging from 0.01 to 2% with respect to a total weight of the lubricant composition.

Further, in recent years, nanocarbon materials have been considered to have great potential as additives for lubricants which improve functions of lubricants (for example, wear resistance, low friction and others).

SUMMARY OF THE INVENTION

However, nanocarbon materials, particularly, nanodiamonds, fullerenes and others are expensive, and thus, additives for lubricants substituting these materials have been needed.

Therefore, the present invention provides an additive for lubricants, a lubricant composition, a method for producing an additive for lubricants and a method for producing a lubricant composition which are more all-purpose and improve functions of lubricants (for example, wear resistance, low friction and others).

The present invention relates to an additive for lubricants containing, a $ZrO_2$ particle coated with a silane coupling agent, and a dispersion medium for the $ZrO_2$ particle, wherein a BET specific surface area of the $ZrO_2$ particle coated with the silane coupling agent obtained by removing the dispersion medium is 40% or more of a BET specific surface area of the $ZrO_2$ particle before coating with the silane coupling agent.

Further, the present invention relates to a lubricant composition containing, the above additive for lubricants.

Further, the present invention relates to a method for producing an additive for lubricants containing a $ZrO_2$ particle coated with a silane coupling agent, including: mixing the $ZrO_2$ particle with a dispersion medium for the $ZrO_2$ particle; and reacting the $ZrO_2$ particle with the silane coupling agent in the obtained mixture such that a BET specific surface area of the $ZrO_2$ particle coated with the silane coupling agent obtained by removing the dispersion medium from the mixture after the reaction of the $ZrO_2$ particle with the silane coupling agent reaches 40% or more of a BET specific surface area of the $ZrO_2$ particle before coating with the silane coupling agent.

Further, the present invention relates to a method for producing a lubricant composition including, mixing the above additive for lubricants with a lubricant.

The present invention can provide an additive for lubricants, a lubricant composition, a method for producing an additive for lubricants and a method for producing a lubricant composition which improve functions of lubricants (for example, wear resistance, low friction and others).

BRIEF DESCRIPTION OF DRAWINGS

FIG. 1 A diagram showing appearances of plate surfaces after a sliding test, and cross-sectional surface roughness curves in the plate surfaces.

EMBODIMENTS OF THE INVENTION

The present inventors found out that, when a reaction of a $ZrO_2$ particle with a silane coupling agent is carried out in a liquid, a surface condition of the $ZrO_2$ particle coated with the silane coupling agent affects compatibility of the $ZrO_2$ particle with lubricants or the like. In the present invention, this surface condition of the $ZrO_2$ particle is indirectly determined by means of a proportion of a BET specific surface area of the $ZrO_2$ particle coated with the silane coupling agent to a BET specific surface area of the $ZrO_2$ particle before coating with the silane coupling agent (hereinafter also referred to as a proportion of a post-coating BET specific surface area), wherein the $ZrO_2$ particle coated with the silane coupling agent is obtained by removing a dispersion medium for the $ZrO_2$ particle from a $ZrO_2$ dispersion liquid containing the $ZrO_2$ particle coated with the silane coupling agent and the dispersion medium for the $ZrO_2$ particle, and a BET specific surface area thereof is measured and used as the BET specific surface area of the $ZrO_2$ particle coated with the silane coupling agent.

The additive for lubricants of the present invention improves compatibility with lubricants to improve dispersibility in lubricants, leading to stable expression of functions. In addition, the additive for lubricants of the present invention is considered to contribute to further improvement of wear resistance or low friction, which is a function of lubricants. Note that wear resistance imparted by the lubricant composition of the present invention is one of the durability characteristics, and may mean that a sliding surface of a plate or the like resists wear caused by repetitive use, and maintains performance.

<Additive for Lubricants>

The additive for lubricants of the present invention contains a $ZrO_2$ particle coated with a silane coupling agent (hereinafter also referred to as a coated $ZrO_2$ particle) and a dispersion medium for the $ZrO_2$ particle (hereinafter also referred to as a dispersion medium), wherein a BET specific surface area of the $ZrO_2$ particle coated with the silane coupling agent in dry condition obtained by removing the dispersion medium is 40% or more of a BET specific surface area of the $ZrO_2$ particle before coating with the silane coupling agent (hereinafter also referred to as an uncoated $ZrO_2$ particle).

The additive for lubricants of the present invention may be the additive for lubricants containing the coated $ZrO_2$ particle coated with the silane coupling agent, wherein the coated $ZrO_2$ particle is obtained by reacting the $ZrO_2$ particle with the silane coupling agent in a mixture of the $ZrO_2$ particle and the dispersion medium.

Further, the additive for lubricants of the present invention may be an additive for lubricants containing a $ZrO_2$ particle which has been reacted with a silane coupling agent by a wet process, wherein a BET specific surface area of the $ZrO_2$ particle coated with the silane coupling agent obtained by removing a dispersion medium from a mixture containing the $ZrO_2$ particle coated with the silane coupling agent and the dispersion medium after the wet-process reaction is 40% or more of a BET specific surface area of the $ZrO_2$ particle before coating with the silane coupling agent.

Note that, in the present invention, "being reacted by a wet process" may mean that, when a $ZrO_2$ particle is reacted with a silane coupling agent, the $ZrO_2$ particle and a dispersion medium are mixed respectively in an amount of less than 90 mass % and in an amount of more than 10 mass % relative to a total mixing amount of the $ZrO_2$ particle, the silane coupling agent and the dispersion medium, and the reaction of the $ZrO_2$ particle with the silane coupling agent is carried out.

The additive for lubricants of the present invention enables the coated $ZrO_2$ particle to be stably dispersed in dispersion media and lubricants, and is excellent in compatibility with lubricants. Further, lubricant compositions obtained by using the additive for lubricants of the present invention can improve wear resistance or low friction of sliding portions.

First, the $ZrO_2$ particle before coating with the silane coupling agent, in other words, the uncoated $ZrO_2$ particle is explained. The uncoated $ZrO_2$ particle can be obtained, for example, by a hydrothermal process or the like.

Preferable examples of a form of the uncoated $ZrO_2$ particle include a spherical form or an ellipsoidal form, and for example, an aspect ratio of the uncoated $ZrO_2$ particle (a ratio between a shortest diameter and a longest diameter of the particle) is preferably 0.5 or more and 2 or less and more preferably 0.7 or more and 1.5 or less. Similarly, it is preferable that a form of the coated $ZrO_2$ particle be also the same as in the case of the uncoated $ZrO_2$ particle and an aspect ratio of the coated $ZrO_2$ particle also fall within the above range.

If the aspect ratios of the uncoated $ZrO_2$ particle and the coated $ZrO_2$ particle fall within the above range, wear is suppressed, and as a result, performance of lubricant compositions finally obtained is still further enhanced.

As the uncoated $ZrO_2$ particle, a $ZrO_2$ particle with an average primary particle size of preferably 1.0 nm or more and 50.0 nm or less, more preferably 3.0 nm or more and 20.0 nm or less and further preferably 5.0 nm or more and 15.0 nm or less can be used. When the uncoated $ZrO_2$ particle is not spherical, this average primary particle size is a particle size of a circumscribed sphere of the uncoated $ZrO_2$ particle. Note that, preferably, a form of the coated $ZrO_2$ particle is also the same as in the case of the uncoated $ZrO_2$ particle, and an average primary particle size of the $ZrO_2$ particle also falls within the above range.

This average primary particle size is a numerical value determined from an average value of particle sizes of 200 or more particles arbitrarily measured from TEM images obtained from observation with a transmission electron microscope (TEM). Using the uncoated $ZrO_2$ particle and the coated $ZrO_2$ particle with an average primary particle size falling within the above range is effective at suppressing wear derived from coarse and large particles. Further, in the case of those with an average primary particle size of 1.0 nm or more, increase of agglomeration force exerted between particles due to micronization is suppressed, and dispersibility in solvents or lubricant compositions is improved.

A coefficient of variation ((standard deviation σ/average primary particle size)×100(%)) of a particle size distribution of the uncoated $ZrO_2$ particle is preferably 1.0% or more and 40.0% or less and more preferably 1.0% or more and 30.0% or less. Note that a coefficient of variation of a particle size distribution of the coated $ZrO_2$ particle preferably also falls within the above range as in the case of the uncoated $ZrO_2$ particle.

If the coefficients of variation of the particle size distributions fall within the above range, the particle sizes are uniform, and coarse and large particles are not contained, advantageously attaining improved transparency and reduced coefficients of friction of the additive for lubricants and lubricant compositions.

The BET specific surface area of the uncoated $ZrO_2$ particle is preferably 10 $m^2/g$ or more and 1000 $m^2/g$ or less, more preferably 50 $m^2/g$ or more and 300 $m^2/g$ or less and further preferably 70 $m^2/g$ or more and 200 $m^2/g$ or less. The BET specific surface area is a BET specific surface area value measured by a single-point method using a device for measuring a specific surface area of powder (for example, a fully automatic BET specific surface area measurement device (Macsorb HM Model-1210) manufactured by MOUNTECH Co., Ltd.) in conformance with JIS Z-8830 (Determination of the specific surface area of powders by gas adsorption). When the BET specific surface area of the $ZrO_2$ particle coated with the silane coupling agent is measured, it can also be measured in the same manner using the $ZrO_2$ particle coated with the silane coupling agent obtained by removing the dispersion medium.

The BET specific surface area of the $ZrO_2$ particle coated with the silane coupling agent may be 40% or more, preferably 50% or more, more preferably 55% or more, further preferably 60% or more and furthermore preferably 70% or more, and for example, 200% or less, further 150% or less, further 100% or less and further 90% or less of the BET specific surface area of the $ZrO_2$ particle before coating with the silane coupling agent, wherein the BET specific surface area of the $ZrO_2$ particle coated with the silane coupling agent is measured in dry condition after the dispersion medium is removed from the additive for lubricants containing the $ZrO_2$ particle and the dispersion medium.

In other words, in the additive for lubricants of the present invention, the BET specific surface area of the $ZrO_2$ particle coated with the silane coupling agent obtained by removing the dispersion medium from the mixture after the reaction of the uncoated $ZrO_2$ particle with the silane coupling agent is 40% or more, preferably 50% or more, more preferably 55% or more, further preferably 60% or more and furthermore preferably 70% or more of the BET specific surface area of the $ZrO_2$ particle before coating with the silane coupling agent. This proportion of the BET specific surface area of the $ZrO_2$ particle coated with the silane coupling agent to the BET specific surface area of the $ZrO_2$ particle before coating with the silane coupling agent [hereinafter also referred to as a proportion of a post-coating BET specific surface area] is effective on stability of the additive for lubricants or compatibility when it is added to lubricants. An upper limit thereof is not particularly limited, but may be, for example, 200% or less, further 150% or less, further 100% or less and further 90% or less.

The dispersion medium for the coated $ZrO_2$ particle is not particularly limited as long as it enables the coated $ZrO_2$ particle to be dispersed. As the dispersion medium, for example, water or an organic compound can be used. Either a single dispersion medium or a combination of multiple dispersion media can be used.

An organic compound as the dispersion medium can be selected from compounds known as organic solvents, and the lubricants described later in detail. Specific examples of a preferable organic compound as the dispersion medium can include methanol, ethanol, isopropanol, butanol, cyclohexanol, methyl ethyl ketone, methyl isobutyl ketone, cyclohexanone, ethyl acetate, propyl acetate, butyl acetate, methyl cellosolve, cellosolve, butyl cellosolve, cellosolve acetate, propylene glycol monomethyl ether, propylene glycol monomethyl ether acetate, tetrahydrofuran, 1,4-dioxane, n-hexane, cyclopentane, toluene, xylene, N, N-dimethylformamide, N, N-dimethylacetamide, dichloromethane, trichloroethane, trichloroethylene, hydrofluoroether or the like.

<Silane Coupling Agent>

In the present invention, examples of the silane coupling agent with which the $ZrO_2$ particle is coated can include the following, but are not limited thereto. Either a single silane coupling agent or a combination of multiple silane coupling agents can be used.

Examples of the silane coupling agent include a silane coupling agent having an alkoxy group or a silane coupling agent having no alkoxy group. The silane coupling agent having an alkoxy group is preferably methoxysilane from the viewpoint of reactivity. The silane coupling agent having no alkoxy group is preferably a silazane which quickly reacts as it does not need to be hydrolyzed.

As the silane coupling agent, for example, a methacryloxy-based silane coupling agent, an acryloxy-based silane coupling agent, a hydrocarbon-based silane coupling agent, a vinyl-based silane coupling agent, an epoxy-based silane coupling agent, an amino-based silane coupling agent, an ureide-based silane coupling agent or the like can be used.

Examples of the methacryloxy-based silane coupling agent include 3-methacryloxypropyltrimethylsilane, 3-methacryloxypropylmethyldimethoxysilane, 3-methacryloxypropyltrimethoxysilane, 3-methacryloxypropylmethyldiethoxysilane or 3-methacryloxypropyltriethoxy silane.

Examples of the acryloxy-based silane coupling agent include 3-acryloxypropyltrimethylsilane, 3-acryloxypropylmethyldimethoxysilane, 3-acryloxypropyltrimethoxysilane, 3-acryloxypropylmethyldiethoxysilane or 3-acryloxypropyltriethoxysilane.

Examples of the hydrocarbon-based silane coupling agent include methyltrimethoxysilane, n-propyltrimethoxysilane, hexyltrimethoxysilane, decyltrimethoxysilane, isobutyltrimethoxysilane, phenyltrimethoxysilane, diphenyldimethoxysilane, hexamethyldisilazane or chlorotrimethylsilane.

Examples of the vinyl-based silane coupling agent include allyltrichlorosilane, allyltriethoxysilane, allyltrimethoxysilane, diethoxymethylvinylsilane, trichlorovinylsilane, vinyltrichlorosilane, vinyltrimethoxysilane, vinyltriethoxysilane or vinyltris (2-methoxyethoxy) silane.

Examples of the epoxy-based silane coupling agent include diethoxy (glycidyloxypropyl)methylsilane, 2-(3, 4 epoxycyclohexyl) ethyltrimethoxysilane, 3-glycidoxypropyltrimethoxysilane, 3-glycidoxypropylmethyldiethoxysilane or 3-glycidoxypropyltriethoxysilane. Examples of a styrene-based silane coupling agent include p-styryltrimethoxysilane.

Examples of the amino-based silane coupling agent include N-2(aminoethyl) 3-aminopropylmethyldimethoxysilane, N-2(aminoethyl) 3-aminopropyltrimethoxysilane, N-2(aminoethyl) 3-aminopropyltriethoxysilane, 3-aminopropyltrimethoxysilane, 3-aminopropyltriethoxysilane, 3-triethoxysilyl-N-(1,3-dimethyl-butylidene)propylamine or N-phenyl-3-aminopropyltrimethoxysilane.

Examples of the ureide-based silane coupling agent include 3-ureidopropyltriethoxysilane.

Examples of still another silane coupling agent include the following. Examples include 3-chloropropyltrimethoxysilane as a chloropropyl-based silane coupling agent. Examples include 3-mercaptopropylmethyldimethoxysilane or 3-mercaptopropyltrimethoxysilane as a mercapto-based silane coupling agent. Examples include bis(triethoxysilylpropyl)tetrasulfide as a sulfide-based silane coupling agent. Examples include 3-isocyanatepropyltriethoxysilane as an isocyanate-based silane coupling agent. Examples include 3,3,3-trifluoropropyltrimethoxysilane as a fluorine-based silane coupling agent.

Note that, in the present invention, another coupling agent may be optionally used. Examples of another coupling agent include an aluminum-based coupling agent. Examples of the aluminum-based coupling agent include an acetoalkoxyaluminum diisopropylate.

The silane coupling agent is preferably 3-methacryloxypropyltrimethoxysilane, 3-acryloxypropyltrimethoxysilane, vinyltrimethoxysilane, 3-aminopropyltrimethoxysilane, 3-glycidoxypropyltrimethoxysilane or 3-mercaptopropyltrimethoxysilane which can be chemically bonded to monomers or resins. Further, the silane coupling agent is preferably phenyltrimethoxysilane, hexyltrimethoxysilane, isobutyltrimethoxysilane, 3, 3,3-trifluoropropyltrimethoxysilane or hexamethyldisilazane which has good compatibility with low-polarity monomers or resins.

The additive for lubricants of the present invention can contain the coated $ZrO_2$ particle in an amount of preferably 1 mass % or more and 80 mass % or less, more preferably 2 mass % or more and 70 mass % or less, further preferably 5 mass % or more and 60 mass % or less and furthermore preferably 5 mass % or more and 50 mass % or less. The balance of the additive for lubricants may be the dispersion medium. Composition of the additive for lubricants is almost solely composed of solvents when the concentration of the coated $ZrO_2$ particle is as low as less than 10 mass %, but low-concentration addition is general in lubricant additive applications, and thus, using even at a low concentration is possible.

The additive for lubricants of the present invention can contain the dispersion medium in an amount of, for example, 5 mass % or more and 99 mass % or less, further 5 mass % or more and 95 mass % or less, further 10 mass % or more and 95 mass % or less, further 15 mass % or more and 90 mass % or less and further 30 mass % or more and 85 mass % or less. The contents of the coated $ZrO_2$ particle and the dispersion medium in the additive for lubricants can be adjusted by volatilizing the dispersion medium from the $ZrO_2$ dispersion liquid after the silane coupling reaction or mixing a dispersion medium thereto such that a dispersion medium content of the additive for lubricants of the present invention falls within the above range.

In the additive for lubricants of the present invention, the BET specific surface area of the $ZrO_2$ particle coated with the silane coupling agent obtained by removing the dispersion medium from the mixture after the reaction of the $ZrO_2$ particle with the silane coupling agent is 40% or more, preferably 50% or more, more preferably 55% or more, further preferably 60% or more and furthermore preferably 70% or more relative to the BET specific surface area of the $ZrO_2$ particle before coating with the silane coupling agent. This proportion of the BET specific surface area of the $ZrO_2$ particle coated with the silane coupling agent to the BET specific surface area of the $ZrO_2$ particle before coating with the silane coupling agent is effective on stability of the additive for lubricants or compatibility when the additive for lubricants is incorporated into lubricants, and has effects on uniformity or transparency when lubricant compositions are produced. An upper limit thereof is not particularly limited, but may be, for example, 200% or less, further 150% or less, further 100% or less and further 90% or less.

The additive for lubricants of the present invention may be the additive for lubricants containing the coated $ZrO_2$ particle coated with the silane coupling agent, wherein the coated $ZrO_2$ particle is obtained by mixing the uncoated $ZrO_2$ particle with the silane coupling agent such that a theoretical surface coating rate of the silane coupling agent on the uncoated $ZrO_2$ particle (hereinafter referred to as a theoretical surface coating rate) is preferably 5% or more and 100% or less and more preferably 10% or more and 80% or less, and reacting the uncoated $ZrO_2$ particle with the silane coupling agent. Mixing the uncoated $ZrO_2$ particle with the silane coupling agent at a theoretical surface coating rate falling within the above range and coating the uncoated $ZrO_2$ particle with the silane coupling agent makes it possible to effectively impart functions of the silane coupling agent to the particle surface of the uncoated $ZrO_2$ particle, suppress an increase in the silane coupling agent unreacted, and improve functions derived from $ZrO_2$ particles, such as wear resistance of a lubricant composition containing the coated $ZrO_2$ particle, or the like.

The theoretical surface coating rate is a proportion of a mass of the silane coupling agent used to a minimum mass of the silane coupling agent required for completely coating the particle surface of the uncoated $ZrO_2$ particle [hereinafter referred to as a required amount of the silane coupling agent], and is determined by the following formula (1):

$$\text{theoretical surface coating rate (\%)} = \quad (1)$$
$$[(\text{mass of silane coupling agent used})/$$
$$(\text{required amount of silane coupling agent})] \times 100$$

The above required amount of the silane coupling agent (g) is determined on the basis of the following formula (2) from a value of the BET specific surface area of the uncoated $ZrO_2$ particle and a minimum coating area of the silane coupling agent ($m^2/g$):

$$\text{required amount of silane coupling agent (g)} = [(TA) \times (SSA)] / (MCA) \quad (2)$$

TA: amount of uncoated $ZrO_2$ particle (g)
SSA: BET specific surface area of uncoated $ZrO_2$ particle ($m^2/g$)
MCA: minimum coating area of silane coupling agent ($m^2/g$)

$$MCA = (6.02 \times 10^{23} \times 13 \times 10^{-20}) / (\text{molecular weight of silane coupling agent})$$

In the additive for lubricants of the present invention, a median diameter of the coated $ZrO_2$ particle is equal to or greater than an average particle size of the uncoated $ZrO_2$ particle, and is preferably 1 time or more and 3 times or less, more preferably 1 time or more and 2 times or less and further preferably 1 time or more and 1.5 times or less the average primary particle size of the uncoated $ZrO_2$ particle. The closer the median diameter of the coated $ZrO_2$ particle is to the average primary particle size of the uncoated $ZrO_2$ particle, the more dispersed it is. The median diameter of the coated $ZrO_2$ particle is a value measured by a dynamic light scattering particle size distribution measurement device.

The additive for lubricants of the present invention can optionally contain a dispersant, a photosensitizer, a leveling agent, a surfactant, a defoamer, a neutralizer, an antioxidant, a mold release agent, a UV absorber or the like.

Examples of the dispersant are not particularly limited unless dispersibility of the additive for lubricants is inhibited, but can include, for example, an anionic dispersant having an acid group such as a carboxylic acid or phosphoric acid or a salt of these or the like. Examples of the dispersant include, for example, an acrylic acid-based dispersant, a carboxylic acid-based dispersant, a phosphoric acid-based dispersant, a sulfonic acid-based dispersant or the like.

The additive for lubricants of the present invention can contain the dispersant in an amount of preferably 0.5 mass % or more and 40.0 mass % or less and more preferably 0.5 mass or more and 20 mass % or less relative to the uncoated $ZrO_2$ particle. If the content of the dispersant relative to the uncoated $ZrO_2$ particle is 0.5 mass % or more, dispersion stability can be more certainly obtained. Further, if the content of the dispersant relative to the uncoated $ZrO_2$ particle is 40.0 mass % or less, properties of lubricant compositions can be maintained, and separation of the additive for lubricants and lubricant compositions can be suppressed.

<Lubricant Composition>

The present invention provides a lubricant composition containing the additive for lubricants of the present invention. The lubricant composition of the present invention may be a lubricant composition containing the additive for lubricants of the present invention and a lubricant.

Further, the lubricant composition of the present invention may be a lubricant composition formulated with the additive for lubricants of the present invention. Further, the lubricant composition of the present invention may be a lubricant composition formulated with the additive for lubricants of the present invention and a lubricant.

In the lubricant composition of the present invention, the $ZrO_2$ particle, the dispersion medium and the silane coupling agent stated in the additive for lubricants of the present invention can be preferably used. Further, a preferable proportion of a post-coating BET specific surface area is also the same as in the additive for lubricants of the present invention.

The lubricant composition of the present invention may contain any type of base oil such as a mineral-derived base oil, a synthetically-derived base oil, a naturally-derived base oil or the like as the lubricant depending on case-by-case applications.

The lubricant in the lubricant composition of the present invention may be a mixture (base oil mixture) of one or two or more mineral-derived or synthetically-derived base oils of Groups I-V of the API classification established by the American Petroleum Institute (API).

Examples of mineral-derived base oils include liquid petroleum oils and hydrides, such as solvent-treated or acid-treated paraffinic, naphthenic and mixed paraffinic-naphthenic mineral lubricant oils, and specific examples include paraffinic crude oil, naphthenic crude oil and mixed crude oil.

Further, examples of synthetically-derived base oils include alkyl esters of dicarboxylic acids, polyglycols and alcohols, poly-α-olefins containing polybutene, alkyl benzenes, phosphate esters, water-soluble cutting oils, polysilicone oils, and organic esters of alkylene oxide polymers, interpolymers, copolymers, and derivatives thereof where the terminal hydroxyl group has been modified by esterification, etherification or the like, and specific examples include trixylyl phosphate and tritolyl phosphate. As such a base oil, for example, Highland FRP46 commercially available from ENEOS Corporation or the like can be used.

Further, examples of naturally-derived base oils include animal oils and vegetable oils, and specific examples include whale oil, beef tallow, rapeseed oil and soybean oil.

<Composition of Lubricant Composition and Other Components>

The lubricant composition of the present invention can contain the coated $ZrO_2$ particle in an amount of preferably 0.001 mass % or more and 50 mass % or less, more preferably 0.001 mass % or more and 20 mass % or less, further preferably 0.001 mass % or more and 10 mass % or less, furthermore preferably 0.001 mass % or more and 1 mass % or less, furthermore preferably 0.005 mass % or more and 0.5 mass % or less and furthermore preferably 0.05 mass % or more and 0.5 mass % or less. The additive for lubricants of the present invention is preferably mixed with the lubricant such that the content of the coated $ZrO_2$ particle in the lubricant composition falls within the above range.

The lubricant composition of the present invention can contain the lubricant in an amount of preferably 50 mass % or more and 99.999 mass % or less, more preferably 80 mass or more and 99.999 mass % or less, further preferably 90 mass % or more and 99.999 mass % or less, furthermore preferably 99 mass % or more and 99.999 mass % or less, furthermore preferably 99.5 mass or more and 99.995 mass % or less and furthermore preferably 99.5 mass % or more and 99.95 mass % or less.

The lubricant composition of the present invention can optionally contain any optional component described in the additive for lubricants.

<Method for Producing Additive for Lubricants>

The present invention provides a method for producing an additive for lubricants containing a $ZrO_2$ particle coated with a silane coupling agent, including: mixing the $ZrO_2$ particle with a dispersion medium; and reacting the $ZrO_2$ particle with the silane coupling agent in the obtained mixture such that a BET specific surface area of the $ZrO_2$ particle coated with the silane coupling agent obtained by removing the dispersion medium from the mixture after the reaction of the $ZrO_2$ particle with the silane coupling agent reaches 40% or more of a BET specific surface area of the $ZrO_2$ particle before coating with the silane coupling agent.

In the method for producing an additive for lubricants of the present invention, the $ZrO_2$ particle, the dispersion medium and the silane coupling agent stated in the additive for lubricants of the present invention can be preferably used. Further, a preferable proportion of the post-coating BET specific surface area is also the same as in the additive for lubricants of the present invention.

In the method for producing an additive for lubricants of the present invention, first, the uncoated $ZrO_2$ particle is mixed with the dispersion medium, and the uncoated $ZrO_2$ particle is reacted with the silane coupling agent in this mixture. The silane coupling agent has only to be contained in this mixture, and for example, may be mixed in advance to the dispersion medium or may be mixed to the mixture of the dispersion medium and the uncoated $ZrO_2$ particle. In other words, the method for producing an additive for lubricants of the present invention may be the method for producing an additive for lubricants, wherein the dispersion medium, the uncoated $ZrO_2$ particle and the silane coupling agent are mixed, and the $ZrO_2$ particle is reacted with the silane coupling agent in this mixture.

In the method for producing an additive for lubricants of the present invention, the $ZrO_2$ particle is preferably reacted with the silane coupling agent by a wet process. "Being reacted by a wet process" is as stated in the additive for lubricants of the present invention.

The uncoated $ZrO_2$ particle can be mixed in an amount of preferably 1 mass % or more and 80 mass % or less, more preferably 2 mass % or more and 70 mass % or less, further preferably 5 mass; or more and 60 mass % or less and furthermore preferably 5 mass % or more and 50 mass % or less relative to a total amount of mixed components.

The dispersion medium for the $ZrO_2$ particle can be mixed in an amount of preferably 15 mass % or more and 95 mass % or less, more preferably 30 mass % or more and 95 mass % or less, further preferably 40 mass % or more and 95 mass % or less, furthermore preferably 50 mass % or more and 94 mass % or less and furthermore preferably 50 mass % or more and 94 mass % or less relative to a total amount of mixed components.

The uncoated $ZrO_2$ particle can be mixed with the silane coupling agent such that a theoretical surface coating rate of the silane coupling agent on the uncoated $ZrO_2$ particle is preferably 5% or more and 100% or less and more preferably 10% or more and 80% or less. The theoretical surface coating rate is a proportion of a mass of the silane coupling agent used to a minimum mass of the silane coupling agent required for completely coating the particle surface of the uncoated $ZrO_2$ particle, and is determined by the above formulas (1) and (2). Mixing the uncoated $ZrO_2$ particle with the silane coupling agent such that the theoretical surface coating rate falls within the above range makes it possible to effectively impart functions of the silane coupling agent to the particle surface of powder of the $ZrO_2$ particle, suppress an increase in the silane coupling agent unreacted, and improve functions derived from $ZrO_2$ particles.

When the reaction with the silane coupling agent is carried out, water may be added into the mixture. A mixing amount of water may fall within the range of, for example, 1 time or more and 5 times or less, preferably 1 time or more and 4 times or less and further preferably 1 time or more and 3 times or less a water amount required for hydrolyzing the silane coupling agent. An adjustment to the water amount may be made considering water in the air or water remaining in the dispersion medium. Further, a catalyst which accelerates the reaction of the $ZrO_2$ particle with the silane coupling agent can be mixed to the mixture as necessary. In other word, the mixture contains a catalyst, and the $ZrO_2$ particle can be reacted with the silane coupling agent in the presence of the catalyst.

Examples of the catalyst include inorganic acids such as hydrochloric acid, sulfuric acid and others, organic acids such as acetic acid and others, inorganic bases such as sodium hydroxide, potassium hydroxide and others or organic bases such as triethylamine and others. Either a single catalyst or a combination of multiple catalysts can be used.

An amount of the catalyst is not particularly limited as long as it enables the $ZrO_2$ particle to be sufficiently reacted with the silane coupling agent, but is preferably 0.1 masse or more and 5.0 mass % or less, more preferably 0.1 mass % or more and 2.0 mass % or less and further preferably 0.1 mass % or more and 0.5 mass % or less relative to the uncoated $ZrO_2$ particle. If the mixing amount of the catalyst falls within the above range, effects of the catalyst can be highly maintained without any effects on properties of the additive for lubricants.

A reaction temperature of the $ZrO_2$ particle and the silane coupling agent is not particularly limited as long as it enables the silane coupling agent to be sufficiently reacted and does not cause volatilization of the dispersion medium, but is preferably 10° C. or more and 100° C. or less, more preferably 15° C. or more and 80° C. or less and further preferably 20° C. or more and 70° C. or less. During this reaction, the mixture may be dispersed or stirred with a media-type dispersing machine such as a bead mill or the like or with a stirring machine such as a mechanical stirrer or the like.

A reaction time of the $ZrO_2$ particle and the silane coupling agent is not particularly limited as long as it enables the silane coupling agent to be sufficiently reacted and does not cause volatilization of the dispersion medium, but is preferably 1 hour or more and 24 hours or less, more preferably 1 hour or more and 12 hours or less and further preferably 1 hour or more and 6 hours or less.

The reaction of the uncoated $ZrO_2$ particle with the silane coupling agent is carried out until the proportion of the post-coating BET specific surface area satisfies a predetermined condition stated in the additive for lubricants of the present invention.

In other words, the method for producing an additive for lubricants of the present invention may be the method for producing an additive for lubricants, wherein the $ZrO_2$ particle is reacted with the silane coupling agent such that the proportion of the post-coating BET specific surface area falls within the preferable range described in the additive for lubricants of the present invention.

The method for producing an additive for lubricants of the present invention makes it possible to obtain an additive for lubricants containing a $ZrO_2$ particle coated with a silane coupling agent and a dispersion medium, wherein a BET specific surface area of the $ZrO_2$ particle coated with the silane coupling agent obtained by removing the dispersion medium is 40% or more of a BET specific surface area of the $ZrO_2$ particle before coating with the silane coupling agent.

The additive for lubricants may be free of the dispersion medium used during the production of the additive for lubricants. Further, the additive for lubricants may be obtained by removing the dispersion medium used during the reaction of the $ZrO_2$ particle with the silane coupling agent, and dispersing resulting powder containing the $ZrO_2$ particle coated with the silane coupling agent in another dispersion medium. As another dispersion medium, for example, any dispersion medium listed in the additive for lubricants can be preferably used.

In the production of the additive for lubricants, the optional components such as a dispersant and others listed in the description of the additive for lubricants can be mixed. When these optional components are mixed, they are mixed after the reaction of the $ZrO_2$ particle with the silane coupling agent.

When a dispersant is mixed in the production of the additive for lubricants, a mixing amount of the dispersant is preferably 0.5 mass % or more and 40.0 mass % or less and more preferably 0.5 mass % or more and 20.0 mass % or less relative to the uncoated $ZrO_2$ particle.

<Method for Measuring BET Specific Surface Area of $ZrO_2$ Particle Coated with Silane Coupling Agent>

A BET specific surface area of a $ZrO_2$ particle coated with a silane coupling agent can be measured by the method in conformance with JIS Z-8830 described above.

For example, a required amount of the additive for lubricants of the present invention is separated, and dried under the conditions of 60 to 100° C. and 10 to 15 hours, and a dispersion medium is removed from the additive for lubricants, thus obtaining powder of the $ZrO_2$ particle coated with the silane coupling agent. The dispersion medium removed from the additive for lubricants may be a dispersion medium used during a reaction of the $ZrO_2$ particle with the silane coupling agent.

A BET specific surface area of the obtained powder of the $ZrO_2$ particle coated with the silane coupling agent is measured by the BET specific surface area measurement method described above.

A proportion of the post-coating BET specific surface area is calculated by the formula (3) below on the basis of this BET specific surface area of the $ZrO_2$ particle coated with the silane coupling agent [BET (A)] and a BET specific surface area of the $ZrO_2$ particle before coating with the silane coupling agent (for example, a raw material $ZrO_2$ particle) measured in advance [BET (B)].

$$\text{Proportion of post-coating } BET \text{ specific surface area (\%)} = \qquad (3)$$
$$[BET\ (A)/BET\ (B)] \times 100$$

This proportion of the post-coating BET specific surface area is 40% or more, preferably 50% or more, more preferably 55% or more, further preferably 60% or more and furthermore preferably 70% or more. Further, an upper limit of this proportion of the post-coating BET specific surface area may be, for example, 200% or less, 150% or less, further 100% or less and further 90% or less.

Note that the above proportion of the post-coating BET specific surface area can also be calculated on the basis of an estimated value of the BET specific surface area of the $ZrO_2$ particle before coating with the silane coupling agent, wherein the $ZrO_2$ particle coated with the silane coupling agent contained in the additive for lubricants of the present invention can be brought into contact with an alkali solution such as, for example, a 50% aqueous potassium hydroxide solution and washed therewith and the alkali component can be washed away with water or an alcohol to remove the coating from the coated $ZrO_2$ particle, and a BET specific surface area value of the $ZrO_2$ particle from which the coating has been removed can be measured and used as the estimated value.

<Method for Producing Lubricant Composition>

The present invention provides a method for producing a lubricant composition including, mixing the additive for lubricants of the present invention with a lubricant.

In the method for producing a lubricant composition of the present invention, the $ZrO_2$ particle, the dispersion medium, the silane coupling agent and the lubricant stated in the additive for lubricants of the present invention and the lubricant composition of the present invention can be preferably used. Further, as the additive for lubricants to be mixed with the lubricant, the additive for lubricants of the present invention can be preferably used.

The additive for lubricants is mixed with the lubricant such that a content of a coated $ZrO_2$ particle in the lubricant composition is preferably 0.001 mass % or more and 50 mass % or less, more preferably 0.001 mass % or more and 10 mass % or less, further preferably 0.001 mass % or more and 1 mass % or less, furthermore preferably 0.005 mass % or more and 0.5 mass % or less and furthermore preferably 0.05 mass % or more and 0.5 mass % or less. If the content of the coated $ZrO_2$ particle in the lubricant composition falls within the above range, lubricity of the lubricant composition can be improved, and wear of the lubricant composition can be suppressed.

After the additive for lubricants is mixed with the lubricant, a dispersion medium contained in the additive for lubricants may be removed by distillation under reduced pressure and vacuum drying.

Further, in one aspect, the additive for lubricants added to the lubricant is an additive for lubricants containing the coated $ZrO_2$ particle and the dispersion medium, but a powdery additive for lubricants from which the dispersion medium has been removed can also be added to the lubricant. The additive for lubricants containing the coated $ZrO_2$ particle and the dispersion medium is preferable from the viewpoint of compatibility with the lubricant.

<Method for Selecting Additive for Lubricants>

The present invention provides a method for selecting an additive for lubricants containing a $ZrO_2$ particle coated with a silane coupling agent and a dispersion medium for the $ZrO_2$ particle, including, preparing a predetermined amount of a sample of the additive for lubricants, removing the dispersion medium from the sample of the additive for lubricants, measuring a BET specific surface area of the $ZrO_2$ particle coated with the silane coupling agent obtained by removing the dispersion medium from the sample of the additive for lubricants, and selecting the additive for lubricants if the BET specific surface area is 40% or more of a BET specific surface area of the $ZrO_2$ particle before coating with the silane coupling agent.

The method for selecting an additive for lubricants of the present invention may be the method for selecting an additive for lubricants, wherein the $ZrO_2$ particle is mixed with the dispersion medium for the $ZrO_2$ particle, the $ZrO_2$ particle is reacted with the silane coupling agent in the obtained mixture to produce the additive for lubricants, and the sample is prepared from the additive for lubricants. As preferable aspects of the uncoated $ZrO_2$ particle, the dispersion medium, the silane coupling agent and others in the above reaction, the preferable aspects stated in the additive for lubricants and the method for producing an additive for lubricants can be applied.

In the method for selecting an additive for lubricants of the present invention, the $ZrO_2$ particle, the dispersion medium and the silane coupling agent stated in the additive for lubricants of the present invention can be preferably used. Further, the BET specific surface areas of the $ZrO_2$ particle before coating with the silane coupling agent and after coating with the silane coupling agent can be measured by the same method as the method stated in the additive for lubricants of the present invention and the method for producing an additive for lubricants of the present invention.

The proportion of the BET specific surface area of the $ZrO_2$ particle coated with the silane coupling agent obtained by removing the dispersion medium from the mixture after the reaction of the $ZrO_2$ particle with the silane coupling agent to the BET specific surface area of the $ZrO_2$ particle before coating with the silane coupling agent, a selection criteria for an additive for lubricants of the present invention, is 40% or more, preferably 50% or more, more preferably 55% or more, further preferably 60% or more and furthermore preferably 70% or more. An upper limit of this proportion is not particularly limited, but may be, for example, 200% or less, further 150% or less, further 100% or less and further 90% or less. This proportion can be calculated on the basis of the above formula (3).

EXAMPLES

Example 1-1 and Comparative Example 1-1

180.0 g of a fine $ZrO_2$ particle having an average particle size of 10 nm and a BET specific surface area of 145 $m^2/g$ (manufactured by Kanto Denka Kogyo Co., Ltd.) was mixed with 374.0 g of methyl ethyl ketone (MEK), 40.0 g of 3-methacryloxypropyltrimethoxysilane (trade name: KBM-503, manufactured by Shin-Etsu Chemical Co., Ltd.), 1.5 g of water and 0.45 g of triethylamine, and coarsely dispersed with a dispersing and stirring machine. The mixed liquid obtained through stirring was subjected to a dispersion process at 50° C. or less using a bead mill apparatus, a media-type dispersing machine, and the dispersion process was ended when it was confirmed that a post-coating BET specific surface area (dry condition) of the $ZrO_2$ particle in the mixed liquid was a value in Table 1. MEK was added to the obtained liquid to adjust a $ZrO_2$ concentration to a concentration of 30 mass %, thus preparing the additives for lubricants.

Example 1-2 and Comparative Examples 1-2 and 1-3

The additives for lubricants were prepared in the same manner as in example 1-1, provided that the silane coupling agent was changed to 3-acryloxypropyltrimethoxysilane (trade name: KBM-5103, manufactured by Shin-Etsu Chemical Co., Ltd.)

Example 1-3

20.0 g of the fine $ZrO_2$ particle having an average particle size of 10 nm and a BET specific surface area of 145 $m^2/g$ (manufactured by Kanto Denka Kogyo Co., Ltd.) was mixed with 373.7 g of methyl ethyl ketone (MEK), 6.1 of hexyltrimethoxysilane (trade name: KBM-3063, manufactured by Shin-Etsu Chemical Co., Ltd.) and 0.20 g of triethylamine, and coarsely dispersed with a dispersing and stirring machine. The liquid obtained through stirring was subjected to a dispersion process using a bead mill apparatus, a media-type dispersing machine, and the dispersion process was ended when it was confirmed that a post-coating BET specific surface area (dry condition) of the $ZrO_2$ particle in the mixed liquid was the value in Table 1. MEK was added to the obtained liquid to adjust a $ZrO_2$ concentration to a concentration of 5 mass %, thus preparing the additive for lubricants.

<Measurement of BET Specific Surface Area>

A required amount of each additive for lubricants was separated, and subjected to vacuum drying at 80° C. for 12 hours, and the obtained powder was ground in a mortar. A BET specific surface area of the obtained $ZrO_2$ powder was measured by a BET method based on adsorption and desorption of nitrogen gas using the $ZrO_2$ powder and using a fully automatic BET specific surface area measurement device (Macsorb HM Model-1210) manufactured by MOUNTECH Co., Ltd.

Production of Lubricant Compositions of Examples 2-1 to 2-3

The additive for lubricants of example 1-1 described above was added to a phosphate ester-based lubricant oil (manufactured by ENEOS Corporation, Highland FRP46) such that a $ZrO_2$ concentration was as shown in Table 2. This was subjected to ultrasonic dispersion for 1 hour, and then, MEK was removed by a rotary evaporator and a vacuum dryer at 50° C. until an NMR measurement signal thereof disappeared, thus obtaining the lubricant compositions of examples 2-1 to 2-3.

<Evaluation of Transparency>

Baseline corrections were made with the above phosphate ester-based lubricant oil as a blank.

Next, lubricant compositions containing this phosphate ester-based lubricant oil and the additives for lubricants of examples 1-1 to 1-3 were each filled into a glass cell with an optical path length of 3 mm. In the lubricant compositions, the additives for lubricants of examples 1-1 to 1-3 were mixed with the phosphate ester-based lubricant oil such that coated $ZrO_2$ concentrations were the concentrations in Table 1.

Further, a transmittance of each lubricant composition at a wavelength of 500 nm was measured using a ratio beam-type UV visible spectrophotometer (U-5100) manufactured by Hitachi High-Tech Science Corporation to evaluate transparency thereof. The results are shown in Table 1. The higher the transmittance is, the more excellent dispersibility of the coated $ZrO_2$ particle is.

As shown in Table 1, the lubricant compositions containing the additives for lubricants of examples 1-1 to 1-3 all had a transmittance of more than 80% T, and were excellent in the dispersibility of the coated $ZrO_2$ particles.

<Theoretical Surface Coating Rate>

The preparation amounts of the silane coupling agents to be mixed with the uncoated $ZrO_2$ particle were determined such that theoretical surface coating rates calculated on the basis of the above formulas (1) and (2) were as shown in the table. A theoretical surface coating rate is a theoretical value when a total amount of a silane coupling agent used forms a monomolecular film on the surface of $ZrO_2$ particles.

TABLE 1

|  |  |  | Example | | | Comparative example | | |
|---|---|---|---|---|---|---|---|---|
|  |  |  | 1-1 | 1-2 | 1-3 | 1-1 | 1-2 | 1-3 |
| Additive for lubricants | Post-coating BET specific surface area (dry condition) | $m^2/g$ | 106 | 116 | 119 | 29 | 56 | 56 |
|  | Proportion of post-coating BET specific surface area to pre-coating BET specific surface area | % | 73.1 | 80.0 | 82.1 | 20.0 | 38.6 | 38.6 |
|  | Silane coupling agent |  | KBM-503 | KBM-5103 | KBM-3063 | KBM-503 | KBM-5103 | KBM-5103 |
|  | Theoretical surface coating rate | % | 50 | 50 | 80 | 50 | 50 | 50 |
| Lubricant composition | $ZrO_2$ concentration | mass % | 20 | 20 | 20 | 20 | 20 | 1 |
|  | Transmittance | % T | >80 | >80 | >80 | 11 | Turbid on mixing | Turbid on mixing |

As shown in Table 1, it can be understood that a proportion of a post-coating BET specific surface area to the pre-coating BET specific surface area falling within a predetermined range resulted in significantly improved dispersibility in the phosphate ester-based lubricant oil regardless of which types of silane coupling agents were used. From this result, it is inferred that the additives for lubricants of examples 1-1 to 1-3 can achieve increased dispersibility of coated $ZrO_2$ particles not only in the compositions with the phosphate ester-based lubricant oil used in the examples, but also in compositions with various types of lubricants.

It is further inferred from this result that, if a proportion of a post-coating BET specific surface area to a pre-coating BET specific surface falls within the predetermined range, and further, an optimized type or coating amount of a silane coupling agent is used, increased dispersibility of coated $ZrO_2$ particles in various types of lubricants can be achieved.

<Evaluation of Wear Resistance>

A sliding test was conducted using a surface property tester (TriboGear TYPE: 32, Shinto Scientific Co., Ltd.) to make wear resistance evaluations of the lubricant compositions of examples 2-1 to 2-3 shown in Table 2. Comparative example 2-1 is a lubricant composition composed solely of the above phosphate ester-based lubricant oil.

The test conditions were the following: sliding distance 10 mm, sliding speed 1200 mm/min, contact load 2.0 N (counterface: RUJ2, diameter 3 mm (Ra=0.02 μm), HRC60 (700HV), contact pressure 1301 MPa), number of sliding 1000 times, high-carbon chromium steel (SUJ2) ball, and lubricant oil amount 500 μL. A method for supplying each oil was by applying it to a plate.

500 μL of each of examples 2-1 to 2-3 and the lubricant oil of comparative example 2-1 was applied to a high-carbon chromium steel (SUJ2) plate, and the sliding test was conducted under the above conditions to measure a coefficient of friction. The coefficients of friction shown in Table 2 are average values of 200 to 300 cycles of measurements. A reduced $ZrO_2$ concentration resulted in a reduced coefficient of friction.

Further, the plates after the sliding test were observed with a laser microscope (magnification 500 times) to make wear mark evaluations. Further, cross-sectional surface roughness curves of the plates after the sliding test were measured using the laser microscope, and evaluations of the lubricant compositions were made on the basis of the cross-sectional surface roughness curves. For the measurements of the cross-sectional surface roughness curves, calculations were made on the basis of reflectances on the plate surfaces when laser was applied to the plate surfaces.

FIG. 1 shows appearances of the plate surfaces and the cross-sectional surface roughness curves of the plates, and Table 2 shows the observation results of the plates. In the FIGURE, the dotted-line frames show sliding areas on the plate surfaces. Further, in FIG. 1, the dotted lines perpendicular to a sliding direction (the vertical dotted lines in the FIGURE) show areas where the measurements of the cross-sectional surface roughness curves were made.

Note that wear marks observed on the plates were evaluated on the basis of the following evaluation criteria.

Evaluation Criteria

A: the wear marks observed under a magnification of 500 times were further fewer than in comparative example 2-1

B: the wear marks observed under a magnification of 500 times were fewer than in comparative example 2-1

C: the wear marks observed under a magnification of 500 times were as many as in comparative example 2-1

TABLE 2

| | | Lubricant composition | | |
|---|---|---|---|---|
| | | Additive for lubricants | $ZrO_2$ concentration mass % | Coefficient of friction µ | Wear mark |
| Example | 2-1 | Example 1-1 | 1 | 0.095 | B |
| | 2-2 | Example 1-1 | 0.1 | 0.090 | A |
| | 2-3 | Example 1-1 | 0.01 | 0.089 | C |
| Comparative example | 2-1 | — | 0 | 0.094 | C |

It can be understood that examples 2-1 and 2-2 showing no wear marks in FIG. 1 are more wear-resistant compared to comparative example 2-1. Particularly, in example 2-2, wear marks were not observed on the plate, and the plate surface was made to be smoother than before the friction test. Further, in examples 2-2 to 2-3, the coefficients of friction were lower than in comparative example 2-1.

The invention claimed is:

1. An additive for lubricants comprising, a $ZrO_2$ particle coated with a silane coupling agent, and a dispersion medium for the $ZrO_2$ particle, wherein a BET specific surface area of the $ZrO_2$ particle coated with the silane coupling agent obtained by removing the dispersion medium is 40% or more of a BET specific surface area of the $ZrO_2$ particle before coating with the silane coupling agent.

2. The additive for lubricants according to claim 1, comprising the $ZrO_2$ particle coated with the silane coupling agent in an amount of 1 mass % or more and 80 mass % or less.

3. A lubricant composition comprising, the additive for lubricants according to claim 1.

4. A method for producing an additive for lubricants containing a $ZrO_2$ particle coated with a silane coupling agent, comprising:

mixing a $ZrO_2$ particle with a dispersion medium for the $ZrO_2$ particle; and reacting the $ZrO_2$ particle with a silane coupling agent in the obtained mixture until a BET specific surface area of the $ZrO_2$ particle coated with the silane coupling agent obtained by removing the dispersion medium from the mixture after the reaction of the $ZrO_2$ particle with the silane coupling agent reaches 40% or more of a BET specific surface area of the $ZrO_2$ particle before coating with the silane coupling agent.

5. The method for producing an additive for lubricants according to claim 4, wherein the mixture comprises a catalyst.

6. The method for producing an additive for lubricants according to claim 4, wherein a reaction temperature of the $ZrO_2$ particle and the silane coupling agent is 10° C. or more and 100° C. or less.

7. The method for producing an additive for lubricants according to claim 4, wherein the dispersion medium is removed from the mixture, and resulting powder containing the $ZrO_2$ particle coated with the silane coupling agent is dispersed in another dispersion medium.

8. A method for producing a lubricant composition comprising, mixing the additive for lubricants according to claim 1 with a lubricant.

9. The method for producing a lubricant composition according to claim 8, wherein the dispersion medium contained in the additive for lubricants is removed from the mixture of the additive for lubricants and the lubricant.

* * * * *